US008245535B2

(12) United States Patent  
Weng et al.

(10) Patent No.: US 8,245,535 B2
(45) Date of Patent: Aug. 21, 2012

(54) METHOD OF STRENGTHENING GLASS PLATE

(75) Inventors: Chien-Min Weng, Tao-Yuan (TW);
Tzu-Wen Chu, Tao-Yuan (TW);
Chiao-Ning Huang, Tao-Yuan (TW);
Fu-Jen Wang, Tao-Yuan (TW);
Shih-Liang Chou, Tao-Yuan (TW);
I-Wen Lee, Chung Li (TW);
Ching-Hsiu Cheng, Chung Li (TW)

(73) Assignees: Applied Vacuum Coating Technologies Co., Ltd., Tao-Yuan (TW); Avct Optical Electronic Co., Ltd., Chung Li (TW)

(*) Notice: Subject to any disclaimer, the term of this patent is extended or adjusted under 35 U.S.C. 154(b) by 254 days.

(21) Appl. No.: 12/575,471

(22) Filed: Oct. 8, 2009

(65) Prior Publication Data

US 2011/0056244 A1    Mar. 10, 2011

(30) Foreign Application Priority Data

Sep. 10, 2009 (TW) .............................. 98130612 A

(51) Int. Cl.
*C03C 15/00* (2006.01)
*C03C 21/00* (2006.01)
(52) U.S. Cl. ...................... 65/30.14; 65/30.1; 65/113
(58) Field of Classification Search .............. 65/30.14
See application file for complete search history.

(56) References Cited

U.S. PATENT DOCUMENTS

| 3,628,934    | A  | * | 12/1971 | Duthoit .................... 65/30.14 |
| 4,983,255    | A  | * | 1/1991  | Gruenwald et al. .......... 134/1.1 |
| 5,851,252    | A  | * | 12/1998 | Sato et al. ................ 65/24 |
| 6,366,013    | B1 | * | 4/2002  | Leenders et al. ........... 313/479 |
| 2003/0001511 | A1 | * | 1/2003  | Howald et al. ............. 315/111.21 |
| 2003/0148401 | A1 | * | 8/2003  | Agrawal et al. ............ 435/7.9 |
| 2005/0255327 | A1 | * | 11/2005 | Chaney et al. ............. 428/448 |
| 2006/0070980 | A1 | * | 4/2006  | Marumo et al. ............. 216/88 |
| 2009/0194507 | A1 | * | 8/2009  | Cernak .................... 216/67 |
| 2009/0197048 | A1 | * | 8/2009  | Amin et al. ............... 428/142 |
| 2009/0246513 | A1 | * | 10/2009 | Laroche et al. ............ 428/336 |
| 2009/0277222 | A1 | * | 11/2009 | Iwata et al. .............. 65/30.14 |

OTHER PUBLICATIONS

Puyrenier et al., Effect of plasma treatments on a porous low-k material—Study of pore sealing, Microporous and Mesoporous Materials 106 (2007) pp. 40-48, Feb. 12, 2007.*

* cited by examiner

*Primary Examiner* — Matthew Daniels
*Assistant Examiner* — Lisa Herring
(74) *Attorney, Agent, or Firm* — Jianq Chyun IP Office

(57) ABSTRACT

A method of strengthening glass plate is provided. A plasma treating process is performed on a glass plate so that a surface pore variation of the glass plate after the plasma treating process is reduced relative to the surface pore variation of the glass plate before the plasma treating process, wherein the surface pore variation is a variation degree of surface pores in different unit areas of the glass plate. In the mean time, a melted network crosslinking structure is formed on the surface of the glass plate. Based on the above-mentioned mechanisms, the glass plate is strengthened. The plasma treating process is conducive to strengthen the glass plate whether the plasma treating process is performed before or after the conventional chemical strengthening process.

14 Claims, 3 Drawing Sheets

METHOD OF STRENGTHENING GLASS PLATE

CROSS-REFERENCE TO RELATED APPLICATION

This application claims the priority benefit of Taiwan application serial no. 98130612, filed on Sep. 10, 2009. The entirety of the above-mentioned patent application is hereby incorporated by reference herein and made a part of this specification.

BACKGROUND OF THE INVENTION

1. Field of the Invention

The invention relates to a method of strengthening glass plate, and particularly, to a method of efficiently strengthening glass plate.

2. Description of Related Art

A glass plate has the characteristics of desirable transparence, a well supporting property, great weather resistance, and chemical stability, etc. Therefore, glass plate is widely used in various fields, for example, house appliances such as building materials, furniture, and the like, or technical products such as a display screen, electronic devices, and the like.

In the application of technical products, glass plate is used as a substrate for a display screen, a carrier of an electronic device, a carrier of a touch panel, and the like. Once the glass plate is broken or cracked, the products are damaged and can not be used. Accordingly, the reliability of the products deeply depends on the mechanical strength of the glass plate. Particularly in a portable product, the strength of the glass plate applied therein is much emphasized.

For facilitating desirable strength, glass plate is treated by a strengthening process before being applied in products. The strengthening process can be a physical strengthening process or a chemical strengthening process. The physical strengthening process is performed by rapidly cooling down to a high temperature glass plate, that is, a quench process, so as to form a surface layer with high stress robustness on the surface of the glass plate. The chemical strengthening process uses the principle of ion exchange to replace the ions with smaller radius on the surface of the glass plate by ions with larger radius to form the ion exchanging surface layer.

FIG. 1 illustrates a schematic view of the state of an untreated glass plate. Referring to FIG. 1, a glass plate 100 has a plurality of pores 102 on the surface. The glass plate 100 can be contaminated by the ambient particles or oxidized by the atmospheric oxygen during the storage period before being strengthening. Therefore, the pores 102 of the glass plate 100 in different areas have various sizes and depths, and the distribution of the pores 102s is quite uneven. That is to say, the variation of the pores 102 in a unit area is significant. Accordingly, the chemical strengthening process can not be performed evenly and efficiently on the surface of the glass plate 100. Even if the chemical strengthening process is performed, an uneven distribution of the stress is presented when the glass plate 100 sustains an outer stress, and therefore, the glass plate 100 can be strengthened merely to a limited degree. Specifically, the strength of the glass plate 100 can be enhanced; however, the stress is locally concentrated due to the uneven distribution of the pores 102 so that the strengthening degree of the glass plate 100 is limited after the chemical strengthening process.

SUMMARY OF THE INVENTION

The invention relates to a method of strengthening glass plate to efficiently strengthen a glass plate.

The invention is directed to a method of strengthening glass plate. First, a plasma treating process is performed on a glass plate so that the surface pore variation of the glass plate after the plasma treating process is reduced relative to the surface pore variation of the glass plate before the plasma treating process, wherein the surface pore variation is a variation degree of surface pores in different unit areas of the glass plate. Next, a chemical strengthening process is performed on the glass plate to form a strengthened thin layer.

According to one embodiment of the invention, a surface of the glass plate is treated by the high temperature plasma, and a melted network crosslinking structure is formed after the plasma treating process. Simultaneously, the surface pore variation of the glass plate is reduced relative to the surface pore variation of the glass plate before the plasma treating process.

According to one embodiment of the invention, the plasma treating process is performed under a low pressure such as a working pressure lower than 10 mtorr, preferably, 0.5 mtorr to 3 mtorr.

According to one embodiment of the invention, a plasma gas of the plasma treating process includes air, Ar gas, $N_2$ gas, He gas, $O_2$ gas, $H_2$ gas, or a combination thereof. In one embodiment, the flow rate of the plasma gas is, for example, 10 sccm to 200 sccm.

According to one embodiment of the invention, a power of the plasma treating process is 500 W to 2,000 W.

According to one embodiment of the invention, a thickness of the glass plate is 0.2 mm to 5.0 mm.

According to one embodiment of the invention, the method of performing the chemical strengthening process includes submerging the glass plate in a chemical under a process temperature. The process temperature is 300° C. to 500° C., and the chemical may be potassium nitrate, or a mixed chemical mainly consisting of potassium nitrate.

According to one embodiment of the invention, a material of the glass plate includes soda-lime glass, boro-silicate glass, alumino-silicate glass, or the like having great optical characteristics.

According to one embodiment of the invention, the strengthened thin layer is an ion exchanged layer. A thickness of the ion exchanged layer is substantially 5 μm to 100 μm.

According to one embodiment of the invention, the method of strengthening glass plate further includes performing a post-plasma treating process after the chemical strengthening process. In one embodiment, the process conditions of the post-plasma treating process are the same as the process conditions of the plasma treating process, and the object of performing the post-plasma treating process is similar to that of the plasma treating process performed before the chemical strengthening process. That is to say, the post-plasma treating process is used for reducing the surface pore variation, and the melted network crosslinking structure is formed on the surface of the glass plate so as to further strengthen the glass plate.

In view of the above, the plasma treating process is performed on the glass plate before the chemical strengthening process in the invention. The surface of the glass plate is thus changed to a state with smaller surface porous variation. In the mean time, the uneven distribution of stress is eliminated. Accordingly, the chemical strengthening process is performed evenly on the glass plate so as to greatly strengthen the glass plate. It is noted that the post-plasma treating process performed after the chemical strengthening process facilitates the removal of the potassium nitrate crystals unevenly formed on the surface of the glass plate. Accordingly, the post-plasma treating process is used for reducing the surface pore variation and bonding the melted network crosslinking structure on the surface of the glass plate so as to further strengthen the glass plate.

In order to make the aforementioned and other features and advantages of the invention more comprehensible, the embodiments accompanying the figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
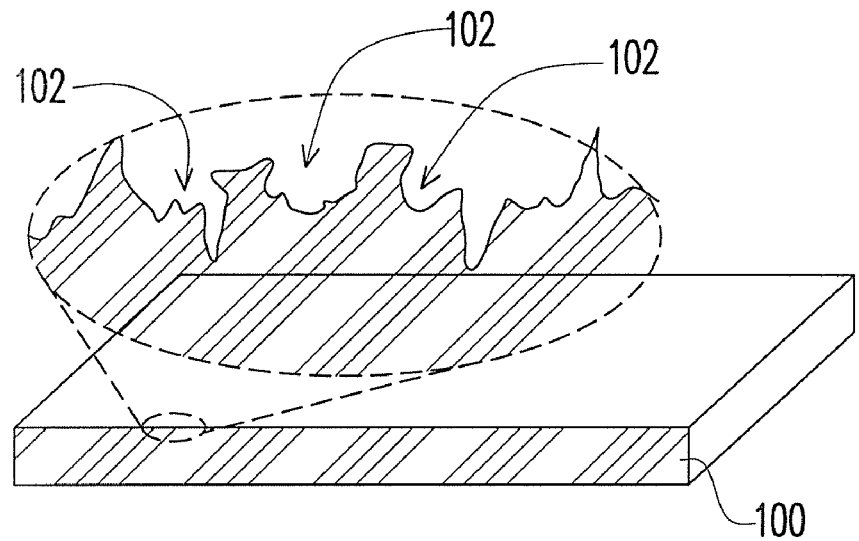
FIG. 1 illustrates a schematic view of the state of an untreated glass plate.
Figure 2:
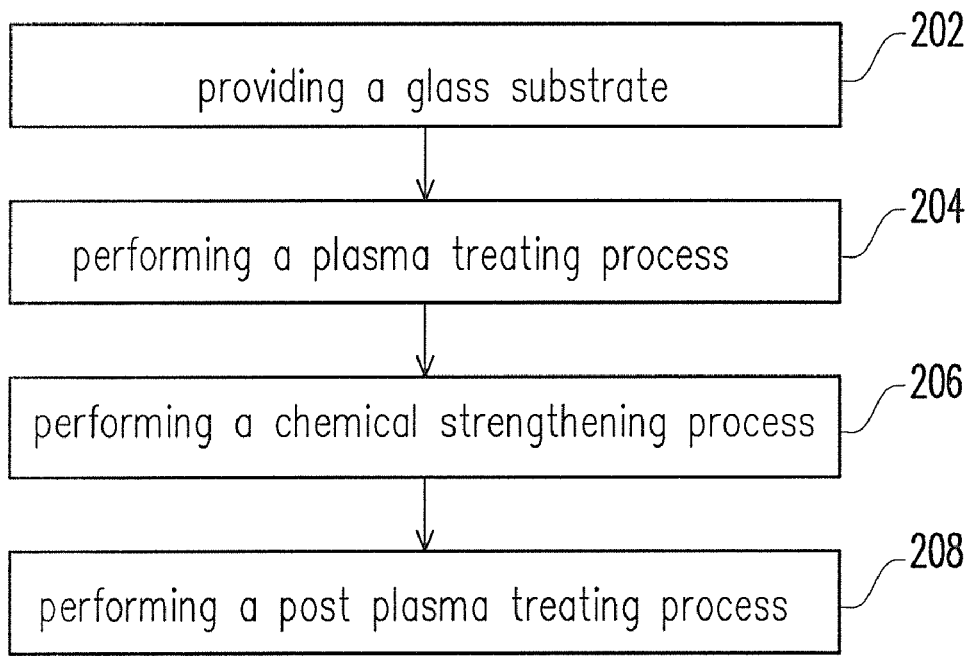
FIG. 2 is a flow chart of a method of strengthening a glass plate according to an embodiment of the invention.

FIG. 2 is a flow chart of a method of strengthening a glass plate according to an embodiment of the invention. Referring to FIG. 2, the step 202 is performed to provide a glass plate, first. Herein, the glass plate 100 illustrated in FIG. 1 is provided as an example. In addition, a surface pore variation is defined in the embodiment as a variation degree of pores 102 in different unit areas on the surface of the glass plate 100. For example, the surface pore variation may be the variation of the average size of the pores 102 in different unit areas, the variation of the average density of the pores 102 in different unit areas, the variation of the average depth of the pores 102 in different unit areas, the variation of the relief of the pores 102 in different unit areas, or the like. As shown in FIG. 1, the glass plate 100 has large surface pore variation before being treated by any process. A material of the glass plate 100 includes soda-lime glass, or the like.

It is noted that the pores 102 illustrated in FIG. 1 are schematically presented, and the pores 102 may be distributed in other states or be in other sizes in a real situation. Furthermore, the glass plate 100 in the embodiment is 0.7 mm in thickness. However, the glass plate 100 suitable for application in the method of the invention can have the thickness of 0.2 mm to 5.0 mm without being limited to the foregoing description.

Next, further referring to FIG. 2, the step 204 is processed to perform a plasma treating process so as to reduce the surface pore variation of the glass plate 100 relative to that of the glass plate 100 before the plasma treating process.

Specifically, the plasma treating process of the step 204 is performed under a low pressure which is below 10 mtorr, preferably, 0.5 mtorr to 3 mtorr, for example. In addition, a plasma gas of the plasma treating process includes air, Ar gas, $N_2$ gas, He gas, $O_2$ gas, $H_2$ gas, or a combination thereof. The flow rate of the plasma gas is, for example 10 sccm to 200 sccm, preferably, 50 sccm to 120 sccm. The power of the plasma treating process can be 500 W to 2,000 W, preferably, 800 W to 1,600 W.

Figure 3:
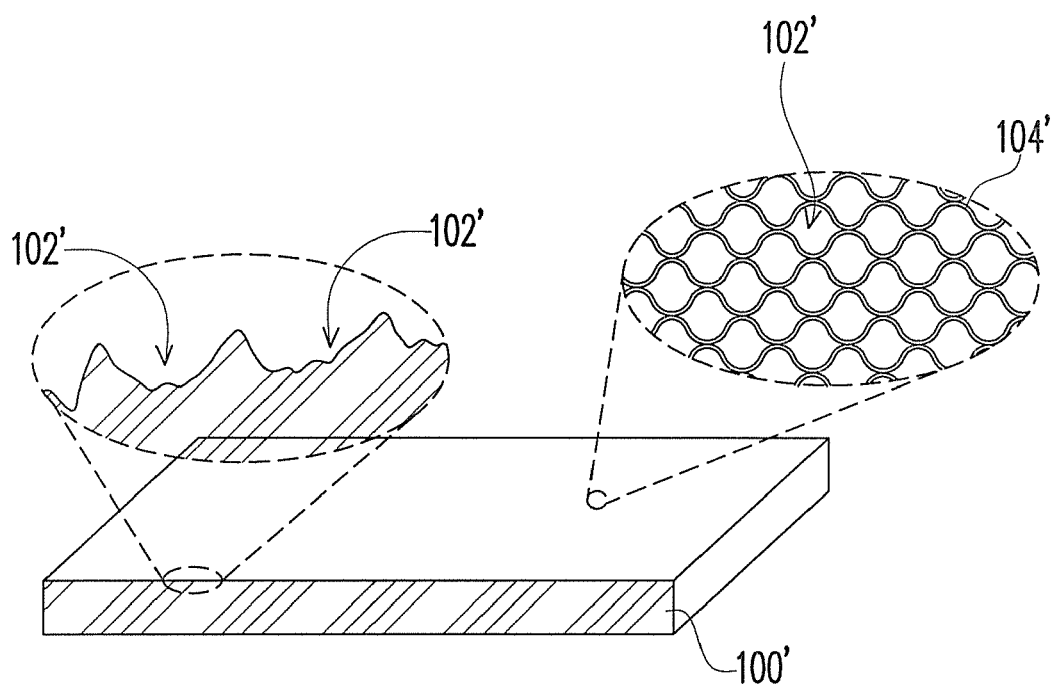
FIG. 3 illustrates a schematic view of the state of a glass plate after being treated by a plasma treating process.

FIG. 3 illustrates a schematic view of the state of a glass plate after being treated by a plasma treating process. Referring to FIG. 3, the surface of the glass plate 100' after being treated by the plasma treating process is different from that of the glass plate 100. Particularly, the pores 102' of the glass plate 100' are more evenly distributed, and the sizes of the pores 102' are much similar. In other words, the surface porous variation of the glass plate 100' is smaller than that of the glass plate 100.

In the embodiment, the plasma treating process uses the plasma to bombard on the surface of the glass plate 100 so that the ambient particles and the oxidized surface layer are separated from the glass plate 100 during the bombarding process. Therefore, the surface of the glass plate 100' is in an even state, that is, the relief of the surface is evenly distributed. In addition to the separations of the ambient particles and the oxidized layer, the surface of the glass plate 100 can be partially melted during the bombarding process. A network crosslinking structure 104' is formed on the surface of the glass plate 100' by the partial melting phenomenon. The network cross linking structure 104' is conducive to link the surface of the glass plate 100' to further enhance the mechanical strength of the glass plate 100'. It is worth noting that the network crosslinking structure 104' is schematically presented here, and the real structure may be in another foam.

Figure 4:
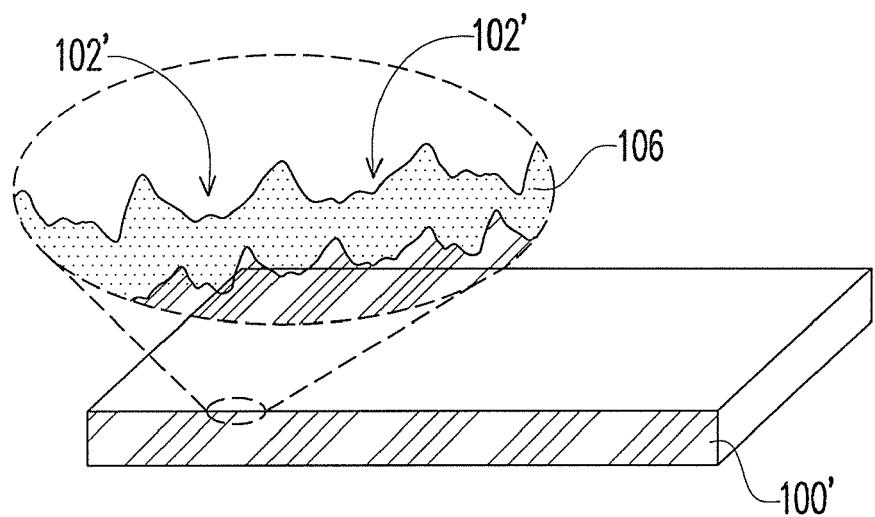
FIG. 4 illustrates a schematic view of the state of a glass plate of FIG. 3 after further being treated by a chemical strengthening process.

Thereafter, referring to FIG. 2, the step 206 is processed by performing a chemical strengthening process on the glass plate 100'. FIG. 4 illustrates a schematic view of the state of a glass plate of FIG. 3 after further being treated by a chemical strengthening process. Referring to FIG. 4, a strengthened thin layer 106 is formed on the surface of the glass plate 100'. A thickness of the strengthened thin layer can be 5 μm to 100 μm, and can be actually varied with the materials of the glass plate 100'. After the plasma treating process, the surface of the glass plate 100' is in a much more homogenous state, and thus the chemical strengthening process is evenly performed on the surface of the glass plate 100'. Accordingly, the strengthened thin layer 106 is evenly distributed at different locations of the surface of the glass plate 100' so as to enhance the mechanical strength of the glass plate 100'.

In the embodiment, the method of performing the chemical strengthening process is, for example, to submerge the glass plate 100' in a chemical solution under a process temperature. The process temperature is 300° C. to 500, and the chemical solution may be potassium nitrate, or a mixed chemical mainly consisting of potassium nitrate. If the material of the glass plate 100' is soda-lime glass, and the chemical solution is potassium nitrate, potassium ion can replace sodium ion on the surface of the glass plate 100'. After the replacement, an ion exchanged layer is formed on the surface of the glass plate 100'. The radius of potassium ion is larger than that of sodium ion, so that the ion exchanged layer has larger surface stress to facilitate the strengthening of the glass plate 100'. Accordingly, the ion exchanged layer is deemed as the strengthened thin layer 106. In one embodiment, the strengthened thin layer 106 is substantially 8 μm to 20 μ in thickness. The above-listed chemical solutions and materials are only typical and not intended to limit the present invention. For example, the material of the glass plate 100 can include boro-silicate glass, alumino-silicate glass, or the like having great optical characteristics.

Figure 5:
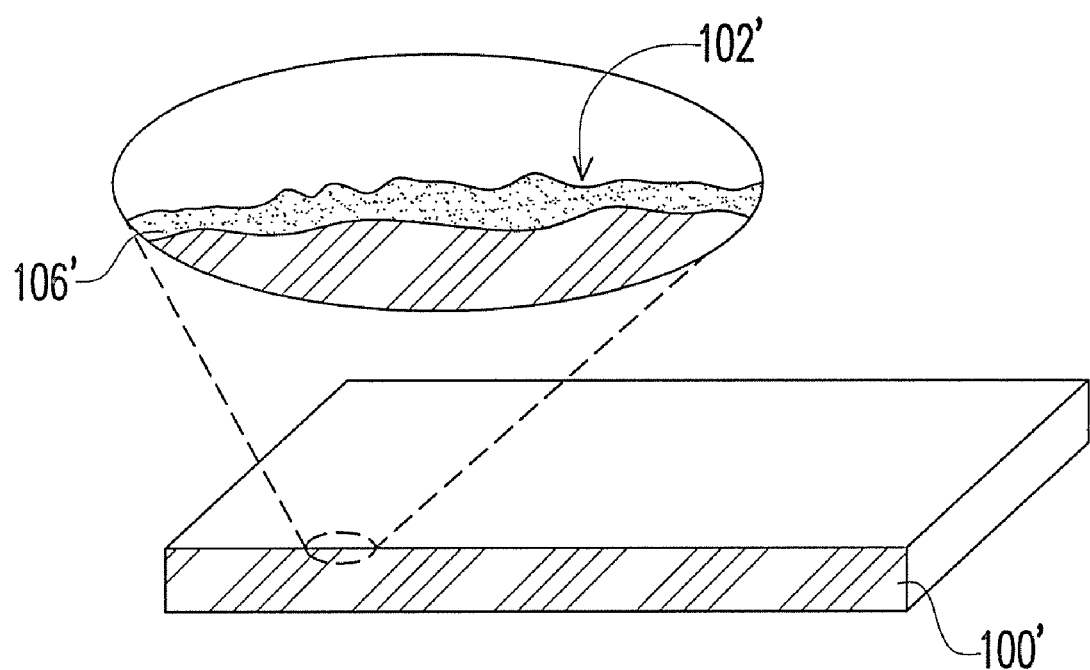
FIG. 5 illustrates a schematic view of the state of a glass plate of FIG. 4 after further being treated by a post-plasma treating process.

In order to further enhance the strength of the glass plate 100', a post-plasma treating process can be further treated after the chemical strengthening process, that is, the step 208 depicted in FIG. 2. FIG. 5 illustrates a schematic view of the state of a glass plate of FIG. 4 after further being strengthened by a post-plasma treating process. Referring to FIG. 5, the strengthened thin layer 106' stands more even distribution after the post-plasma treating process of the step 208 relative to that shown in FIG. 4. That is to say, the surface stress of the glass plate 100' is much more evenly distributed to further enhance the strength of the glass plate 100'. Herein, the process conditions of the post-plasma treating process can be the same as that of the plasma treating process of step 204. However, the process conditions of the post-plasma treating process can be different from that of the plasma treating process of step 204.

The post-plasma treating process makes the surface of the glass plate 100' stand in a more even state, and thus the strengthened thin layer 106' is evenly distributed on the surface of the glass plate 100'. Accordingly, the strength of the glass plate 200' can be further enhanced. In a real test, the strength of the glass plate 100' is quite good after being treated by the steps 204, 206, and 208. In the following description, the results of a drop ball test and a static loading test are presented. The detail processes of tests are well known in the related art and are omitted here.

In the drop ball test using the steel ball with a weight of 130 g and a diameter of 31.75 mm, the glass plates made by the same material and designed in the same size such as 0.7 mm in thickness and 90.52 mm×48.18 mm in area are tested, and the results are as follows. The glass plate without treatment by any process such as the glass plate depicted in step 202 is cracked when the height of the dropping ball is 10 cm. The glass plate only treated by the step 206, that is, the conventional chemical strengthening process, is cracked when the height of the dropping ball is 20 cm. The glass plate treated by both the steps 204 and 206 is cracked when the height of the dropping ball is 40 cm. Furthermore, the glass plate treated by the steps 204, 206, and 208 is cracked when the height of the dropping ball further reaches 60 cm.

In the static loading test, the glass plates made by the same material and designed in the same size are tested, and the results are as follows. The glass plate without treatment such as the glass plate depicted in step 202 is cracked when the loading is 15 kgf. The glass plate only treated by the step 206, that is, the conventional chemical strengthening process, is cracked when the loading is 25 kgf. The glass plate treated by the steps 204 and 206 is cracked when the loading reaches 50 kgf. The glass plate treated by the steps 204, 206, and 208 is cracked when the loading further reaches 70 kgf.

According to the results of the above tests, the glass plate 100' is efficiently strengthened when the above steps 204~208 shown in FIG. 2 are performed only on one surface of the glass plate 100'. However, the invention is not limited thereto, and the steps 204~208 can be further performed on the other surface of the glass plate 100' based on specific requirements. In other words, both surfaces of the glass plate 100' can be treated by the method of strengthening glass plate of the invention. In this way, the strength of the glass plate 100' can be further significantly enhanced, and the yield rate of the products that apply the glass plate 100' is further improved.

In summary, the glass plate is treated by a plasma treating process in the invention. Therefore, the surface of the glass plate is presented in an even state before being treated by the strengthening process. Accordingly, the strengthening process is evenly performed on the glass plate, and the glass plate has superior mechanical character. That is to say, the uneven stress distribution is not easily generated on the glass plate so that the glass plate has better mechanical strength.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method of strengthening a glass plate, the method comprising:

performing a plasma treating process on both surfaces of a glass plate so that a plasma of the plasma treatment directly contacts the surfaces of the glass plate and a surface pore variation of the glass plate after the plasma treating process is reduced relative to the surface pore variation of the glass plate before the plasma treating process, wherein the surface pore variation comprises a variation of an average size of pores in different unit areas of the surface, a variation of an average density of pores in different unit areas of the surface, a variation of an average depth of pores in different unit areas of the surface, or a variation of a relief of pores in different unit areas of the surface; and after the plasma treating process, performing a chemical strengthening process on both surfaces of the glass plate to form a strengthened thin layer, and performing a post-plasma treating process on both surfaces of the glass plate after the chemical strengthening process.

2. The method of claim 1, wherein the surfaces of the glass plate have a network crosslinking structure after performing the plasma treating process to enhance the strength of the glass plate.

3. The method of claim 1, wherein the plasma treating process is performed under a low pressure lower than 10 mtorr.

4. The method of claim 3, wherein the low pressure is 0.5 mtorr to 3 mtorr.

5. The method of claim 1, wherein a plasma gas of the plasma treating process comprises air, Ar gas, $N_2$ gas, He gas, $O_2$ gas, $H_2$ gas, or a combination thereof.

6. The method of claim 5, wherein a flow rate of the plasma gas is substantially 10 sccm to 200 sccm.

7. The method of claim 1, wherein a power of the plasma treating process is substantially 500 W to 2,000 W.

8. The method of claim 1, wherein a thickness of the glass plate is substantially 0.2 mm to 5.0 mm.

9. The method of claim 1, wherein the method of performing the chemical strengthening process comprises submerging the glass plate in a chemical solution under a process temperature.

10. The method of claim 9, wherein the process temperature is substantially 300° C. to 500° C.

11. The method of claim 9, wherein the chemical solution comprises potassium nitrate, or a mixed chemical mainly consisting of potassium nitrate.

12. The method of claim 1, wherein a material of the glass plate comprises soda-lime glass, boro-silicate glass, or alumino-silicate glass.

13. The method of claim 1, wherein the strengthened thin layer is an ion exchanged layer, wherein a thickness of the strengthened thin layer is substantially 5 μm to 100 μm.

14. The method of claim 1, wherein the post-plasma treating process is performed under the same conditions as the plasma treating process.

* * * * *